United States Patent [19]

Evans

[11] 4,093,949
[45] June 6, 1978

[54] CLUTTER TRACKER USING A SMOOTHED DOPPLER FREQUENCY MEASUREMENT

[75] Inventor: Norol T. Evans, San Pedro, Calif.

[73] Assignee: Hughes Aircraft Company, Culver City, Calif.

[21] Appl. No.: 690,330

[22] Filed: May 26, 1976

[51] Int. Cl.² ............................. G01S 9/02; G01S 9/42
[52] U.S. Cl. ................................ 343/7 A; 343/5 DP; 343/7.7
[58] Field of Search ...................... 343/7 A, 7.7, 5 DP

[56] References Cited

U.S. PATENT DOCUMENTS

| | | | |
|---|---|---|---|
| 3,617,719 | 11/1971 | Wong et al. ................... | 343/5 DP X |
| 3,742,500 | 6/1973 | Freedman ....................... | 343/7.7 |
| 3,755,813 | 8/1973 | Evans et al. ................... | 343/7.7 |
| 3,774,206 | 11/1973 | Ranch ............................ | 343/7 A |
| 3,852,742 | 12/1974 | Fletcher et al. .............. | 343/7.7 |
| 3,860,924 | 1/1975 | Evans ............................. | 343/7.7 |
| 3,885,238 | 5/1975 | Klein et al. .................... | 343/7 A |
| 3,962,704 | 6/1976 | Evans ............................. | 343/7.7 |
| 3,972,041 | 7/1976 | Howard ......................... | 343/5 DP X |
| 3,987,442 | 10/1976 | McLeod, Jr. ................... | 343/5 DP X |
| 4,003,054 | 1/1977 | Goldstone ..................... | 343/5 DP X |

*Primary Examiner*—Malcolm F. Hubler
*Attorney, Agent, or Firm*—Martin E. Gerry; W. H. MacAllister

[57] ABSTRACT

A clutter tracker in which received clutter velocity signal is shifted to zero doppler in order that optimum moving target indicator (MTI) cancellaton can be achieved is disclosed. A frequency controllable voltage controlled crystal oscillator (VCXO) is used as the coherent oscillator (COHO) source. The subject digital system changes the VCXO output bus only once per dwell, thus allowing adequate filtering to achieve desired performance without adversely affecting tracking performance.

13 Claims, 13 Drawing Figures

Fig. 7a. Video

Fig. 7b. Clutter Gates

Fig. 7c. I / Digital Bipolar Clutter / Q

CLUTTER TRACKER USING A SMOOTHED DOPPLER FREQUENCY MEASUREMENT

BACKGROUND OF THE INVENTION

1. Field of the Invention

This invention relates generally to radar systems and more particularly to moving target indicator systems operating in clutter environments and using a clutter doppler velocity signal to enhance clutter cancellation.

2. Description of the Prior Art

Analog closed loop moving target indicator (MTI) cancellation systems used in the prior art provide about 40 db of cancellation. These prior art systems continuously modified the signal level on the voltage controlled oscillator (VCO) output bus. This continuous modification plus additional noise pickup on the bus line caused degradation in performance. Efforts to improve these analog systems so as to obtain, for example, 60 db of cancellation were not successful.

SUMMARY OF THE INVENTION

A controlled VCXO is substituted for the COHO reference signal in a conventional MTI or doppler radar system. The clutter doppler velocity is measured and the difference between this and a delayed doppler velocity signal is used to offset the VCXO by the same amount, thus shifting the clutter to substantially zero doppler frequency and causing optimum clutter cancellation.

It is thus an object of the present invention to provide a clutter tracker radar system exhibiting improved clutter cancellation.

An additional object of this invention is to provide over 60 db cancellation in an MTI canceller.

It is a further object of this invention to provide a clutter tracker radar system providing discreet modification of a VCXO bus for each dwell period.

Another object of this invention is to provide filtering to the VCXO bus sufficient to achieve enhanced performance over prior art systems.

DESCRIPTION OF THE PREFERRED EMBODIMENTS

Figure 1:
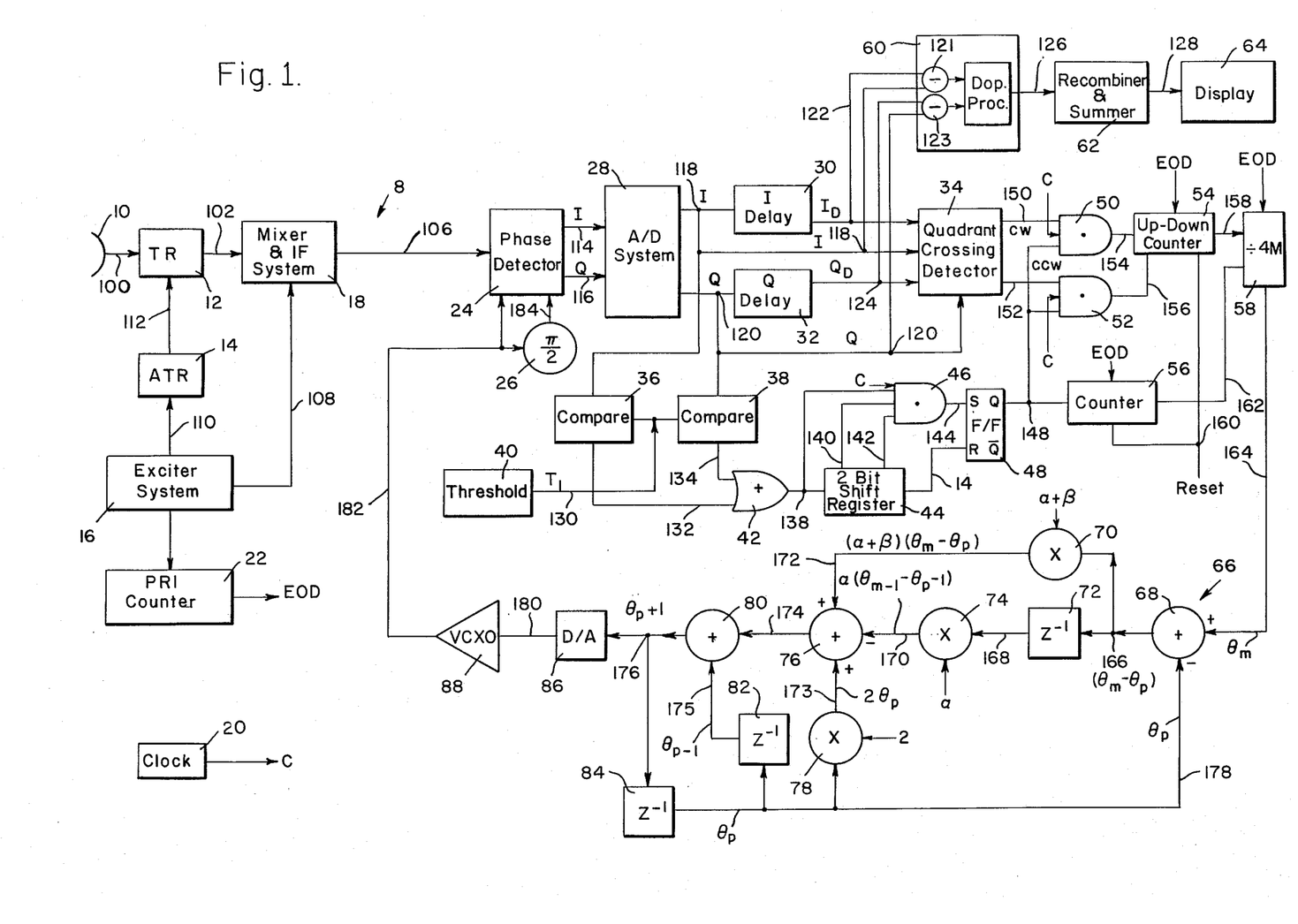
FIG. 1 is a schematic block diagram showing the invention integrated into a total MTI radar system.

Referring first to FIG. 1, a clutter tracker using a 4N crossing detector 34 as a frequency measuring device where $N = 1$ is illustrated by way of example and may be examined in further detail. The parameter N represents the number of phase measurements performed in each 90° quadrant. Reference to and explanation of such exemplary system is not intended to limit the invention to the elements of the example which is presented primarily for the purpose of facilitating an understanding of the basic principles of the invention. This crossing detector with $N = 1$ may be referred to as a quadrant crossing detector. In other examples, if $N = 2$, then $4N = 8$, and an octant crossing detector would be utilized, and so on.

A radar system denoted generally at 8 may comprise an antenna 10 which supplies return echo signals over a lead 100 to the radar system by means of a duplexer which may comprise a transmit-receive (TR) element 12 and an anti-transmit-receive (ATR) element 14 communicating with each other by means of a lead 112. The duplexer communicates with the exciter system 16 by means of a lead 110. Exciter system 16 supplies signal energy to a pulse repetition interval (PRI) counter 22 on a lead 104 which in turn furnishes an end-of-dwell (EOD) signal to up-down counter 54, range bin counter 56 and scaling circuit 58. Exciter system 16 also supplies signal energy to mixer and IF system 18 by means of a lead 108. The duplexer system comprising TR system 12 and ATR system 14 also communicates with mixer and IF system 18 during reception by means of a lead 102. A clock system 20 supplies timing information C to the total radar system. Mixer and IF system 18 supplies signal information to phase detectors 24 by means of a lead 106. Phase detectors 24 in turn supply two signals, an in-phase signal I by means of a lead 114, and a quadrature signal Q by means of a lead 116 to an analog-to-digital converter system 28. After conversion from analog-to-digital form, signals I and Q are supplied to delay elements 30 and 32 respectively by means of leads 118 and 120, these delay elements being part of a first stage of a moving target indicator (MTI) canceller. The I and Q signals derived from analog-to-digital conversion system 28 are also individually supplied to threshold comparison circuits 36 and 38, which comparison circuits also receive threshold information from threshold generator 40 by means of lead 130. The output from comparison circuits 36 and 38 are supplied to logic OR circuit 42 by means of leads 132 and 134 respectively. If either the in-phase or the quadrature component of the signal is thus larger than the threshold signal, indicated as $T_1$, then logic circuit 42 will have a true output on a lead 138. The output from logic circuit 42 on the lead 138 is fed to logic AND circuit 46, which also receives output from a shift register 44 by means of leads 140 and 142. Output from the AND circuit 46 on the lead 144 is fed to a flip-flop circuit 48, whose output on a lead 148 determines a clutter gate. The output of the clutter gate on the lead 148 is fed to a counter 56, which counts the number of range bins that a clutter gate has been in existence as defined by clock C. Output from flip-flop 48 by means of lead 148 is also fed to logic AND circuits 50 and 52, which also receive the output signal from quadrant crossing detector 34. Quadrant crossing detector 34, in addition to receiving the in-phase and quadrature components of the radar system from analog-to-digital conversion system 28, receives also the delayed in-phase component and the delayed quadrature component of that signal from delay circuits 30 and 32 respectively by means of leads 122 and 124. These last four signals, the in-phase signal I, the in-phase delayed signal $I_D$, the quadrature signal Q, and the quadrature delayed signal $Q_D$, are supplied to the remaining portions of the MTI system 60 respectively by means of leads 118, 122, 120 and 124. The remaining MTI system 60, which may include subtractors 121 and 123 of a first MTI canceller stage, furnishes to conventional recombiner and summer system 62 these signals by means of composite lead 126. Recombiner and summer system 62, which may include additional MTI canceller stages when desired, furnishes to a utilization unit such as display system 64, a conventional MTI signal by means of composite lead 128.

Figure 4A:
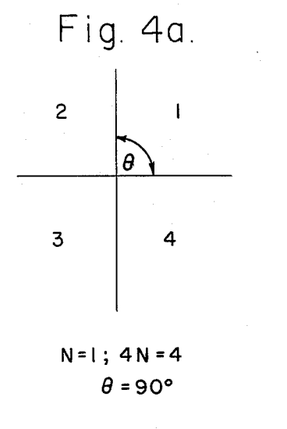
FIG. 4a–4c is a conceptual diagram showing quadrant and higher order crossing systems.

Referring now also to FIG. 4a, the quadrant crossing detector 34 determines the direction of the phase change of the incident signals I, $I_D$, Q, and $Q_D$. If the direction of the phase change of the signal is clockwise and a clutter gate is in existence, logic system 50 when clocked will exhibit a true signal on a lead 154. If, however, the direction of phase change is counter-clockwise, quadrant crossing detector 34 will supply an output signal by means of lead 152 to logic gate 52, and if a clutter gate is in existence logic circuit 52 will exhibit a true signal on lead 156. Up-down counter 54, responsive to signal input from logic circuit 50 and logic circuit 52 by means of leads 154 and 156 respectively, now determines the resultant phase change and presents such information to divide-by-4N or scaling circuit 58 on lead 158. The scaling circuit 58 furnishes its output signal on a lead 164 to an $\alpha\beta$ tracker or signal position and velocity tracker. The signal thus supplied by scaling circuit 58 is a frequency error signal. The $\alpha\beta$ tracker utilizes the detected frequency error and smoothes over three or four dwell periods, so as to give a linear prediction of error and thus reduce second order effects of the error. The $\alpha\beta$ system might be considered as a very simplified version of a Kalman filter, accepting, in our example, input signals in the form of either a step function or a ramp. The equations that describe the $\alpha\beta$ filter are listed below for a system that tracks in angle $\theta$.

1. $\theta_s = \theta_p + \alpha(\theta_m - \theta_p)$

2. $\dot{\theta}_s = \dot{\theta}_{s-1} + (\beta/T)(\theta_m - \theta_p)$

3. $\theta_{p+1} = \theta_s + \dot{\theta}_s T$ where
   $\theta_s$ = the present position
   $\theta_p$ = the predicted position
   $\alpha$ = the position smoothing constant
   $\theta_m$ = the measured position
   $\dot{\theta}_s$ = the present velocity
   $\dot{\theta}_{s-1}$ = the previous velocity
   $\beta$ = the velocity smoothing constant
   $T$ = the time interval between measurements
   $\theta_{p+1}$ = the next predicted position and rewriting equation 3

$$\theta_{p+1} = \theta_p + \alpha(\theta_m - \theta_p) + [\dot{\theta}_{s-1} + (\beta/T)(\theta_m - \theta_p)]T$$

solving equation 3 for $\dot{\theta}_s$ we obtain:

$$\dot{\theta}_s = \frac{\theta_{p+1} - \theta_s}{T} \text{ and } \dot{\theta}_{s-1} = \frac{\theta_p - \theta_{s-1}}{T};$$

by replacing
$p+1$ with $p$ and $s$ with $s-1$.
Then $$\theta_{p+1} = \theta_p + \alpha(\theta_m - \theta_p) + \theta_p - \theta_{s-1} + \beta(\theta_m - \theta_p)$$

and from equation 1

$$\theta_{s-1} = \theta_{p-1} + \alpha(\theta_{m-1} - \theta_{p-1}):$$

by replacing $s$ with $s-1$, $p$ with $p-1$, and $m$ with $m-1$. Then finally,

4. $\theta_{p+1} = 2\theta_p + (\alpha+\beta)(\theta_m - \theta_p) - \theta_{p-1} - \alpha(\theta_{m-1} - \theta_{p-1})$.

For a specific instance in which there has occurred a detection miss, the quantity $(\theta_m - \theta_p)$ will be set equal to zero and then we will have:

$$\theta_{p+1} = 2\theta_p - \theta_{p-1} - \alpha(\theta_{m-1} - \theta_{p-1}).$$

In a representative system the factors $\alpha$ and $\beta$ could have values at about $\alpha \approx 0.7$ and $\beta \approx 0.3$ so that $\alpha + \beta \approx 1.0$.

Still referring to FIG. 1, an adder 68 receives a signal representative of $\theta_m$ on lead 164 and another signal representative of $\theta_p$ on lead 178 and furnishes as its signal output, the quantity $(\theta_m - \theta_p)$ on lead 166 to delay device 72 and $(\alpha+\beta)$ multiplier 70. Delay device 72 furnishes its signal output, $(\theta_{m-1} - \theta_{p-1})$, to $\alpha$ multiplier 74 on lead 168. $\alpha$ multiplier 74 and $(\alpha+\beta)$ multiplier 70 furnish their respective outputs, $\alpha(\theta_{m-1} - \theta_{p-1})$ and $(\alpha + \beta)(\theta_m - \theta_p)$ to adder 76 by means of respective leads 170 and 172. Adder 76 receives input signal representative of the quantity $2\theta_p$ from multiplier 78 by means of lead 173. The output signal from adder 76 represents the quantity $2\theta_p + (\alpha + \beta)(\theta_m - \theta_p) + \alpha(\theta_{m-1} - \theta_{p-1})$ which appears on a lead 174 to adder 80 which also receives signal input representative of $\theta_{p-1}$ from delay device 82 by means of lead 175. Output signal from adder 80 thus represents the quantity $2\theta_p + (\alpha + \beta)(\theta_m - \theta_p) - \theta_{p-1} - \alpha(\theta_{m-1} - \theta_{p-1})$ which quantity, by reference to equation (4) is equal to $\theta_{p+1}$. The signal output from adder 80 representing the quantity $\theta_{p+1}$ is furnished to delay device 84 by means of lead 176. Output signal from delay device 84 is representative of the quantity $\theta_p$ and this signal is furnished by means of lead 178 to multiplier 78 and delay device 82. The output signal from multiplier 78 and its utilization has already been described. The output signal from delay device 82, representative of the quantity $\theta_{p-1}$, is furnished by means of lead 175 to adder 80 as has been described. The $\theta_{p+1}$ output of adder 80 on lead 176 is also furnished to digital-to-analog converter 86 whose output is an error voltage having units of volts per Hz. Voltage controlled crystal oscillator 88 receives this signal representative of a frequency related error voltage and develops therefrom a reference frequency that appears on lead 182. Closing clutter causes a counter-clockwise crossing in crossing detector 34, thus causing the VCXO to increase in frequency, whereas opening clutter causes a clockwise crossing in crossing detector 34 and causes the VCXO to decrease in frequency. The reference frequency appearing on lead 182 is furnished to phase detectors 24 (which includes an in-phase and a quadrature phase detector) in its original form and also on a lead 184 after having been shifted by a phase angle of $\pi/2$ in phase shifter 26.

Figure 4B:
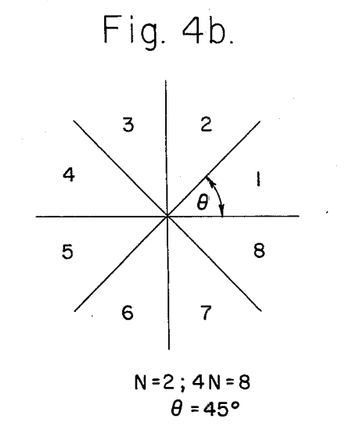
Figure 4C:
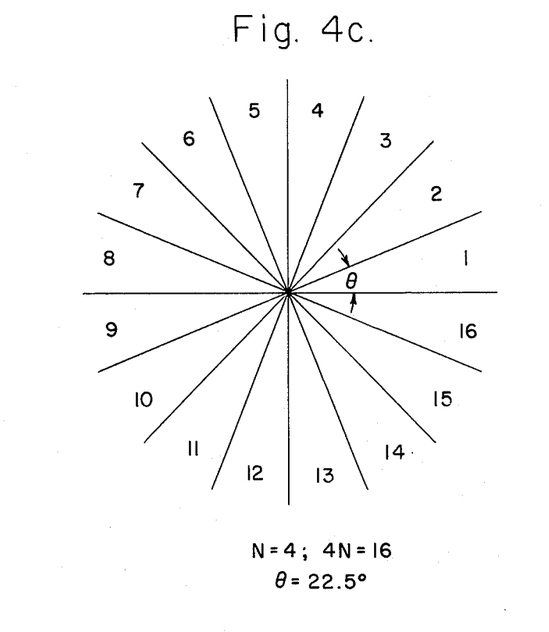

The foregoing may be summarized by reference to FIGS. 1 and 4a, 4b and 4c. The sine bits from the first MTI canceller are used to determined a measure of the clutter doppler frequency. The delayed sine bits with subscript D are examined to determine phase relationships by determining the position of the phase vector at the time of the first transmission. In our exemplary system this measurement determines which quadrant the clutter was in on the first transmission. If one of the sine bits changes state on the next transmission an indication of the clutter motion is ascertained. Since only clutter motion is desired, the crossings are clutter gated by a simple clutter gate comprising in our example OR gate 42, shift register 44, AND gate 46, and flip-flop 48. If, as in our exemplary system, the device contemplates a quadrant detector, we have $N = 1$, so that $4N = 4$, and $\theta = 90°$. Reference to FIGS. 4a, 4b and 4c illustrates the effect of implementing a less "grainy" phase detector. In FIG. 4b, an octant system is shown in conceptual form wherein a crossing is obtained for a phase change of 45°; that is, $N = 2$, $4N = 8$, and $\theta = 45°$. In FIG. 4c, a still less grainy system of order 16 is shown wherein a crossing is established for a phase change of only 22.5°; that is, $N = 4$, $4N = 16$, and $\theta = 22.5°$. These quadrant crossings are then sent to an up-down counter 54, where the counter counts up for a counter-clockwise crossing (approaching doppler), counts down for a clockwise crossing (departing doppler), and does not count in either direction when either the clutter gate signal is false or both the clockwise and counter-clockwise signals are false. Consequently the counter will contain the total number of crossings detected during the sampled interval.

In our exemplary system the clutter gate comprising OR circuit 42, shift register 44, AND circuit 46, and flip-flop 48 requires three crossings of $T_1$ in either I or Q signals in adjacent range bins to generate a clutter gate at 148. Threshold level $T_1$ would typically be set between 10 db and 20 db above the receiver noise level. The output flip-flop 48 and its reset on a zero from the last bit in the shift register causes the clutter gate to stay on for the same number of range bins that the clutter exceeds threshold $T_1$. Another counter 56 is used to count the number of range bins M that the clutter gate existed during the sample interval. At the end of the sample interval, the number of crossings is divided by 4M in dividing circuit 58 to determine the doppler error in Hz. This bipolar number is then sent through the $\alpha\beta$ prediction circuit 66 and then digital-to-analog converted and sent to the VCXO 88 to correct its frequency for its use in phase detectors 24.

Figure 2:
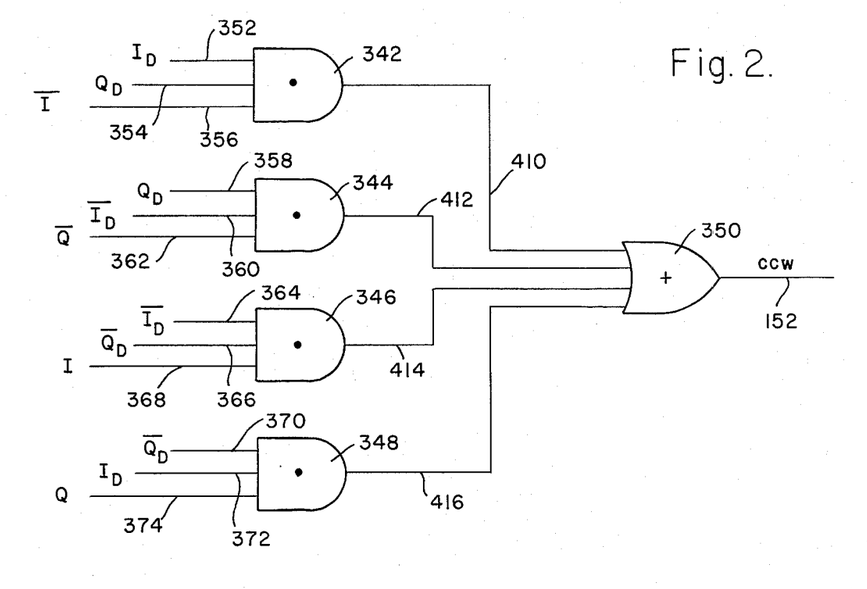
FIG. 2 is a logic diagram for forming the output of a crossing detector for counter-clockwise rotation of the clutter signal phase angle.
Figure 3:
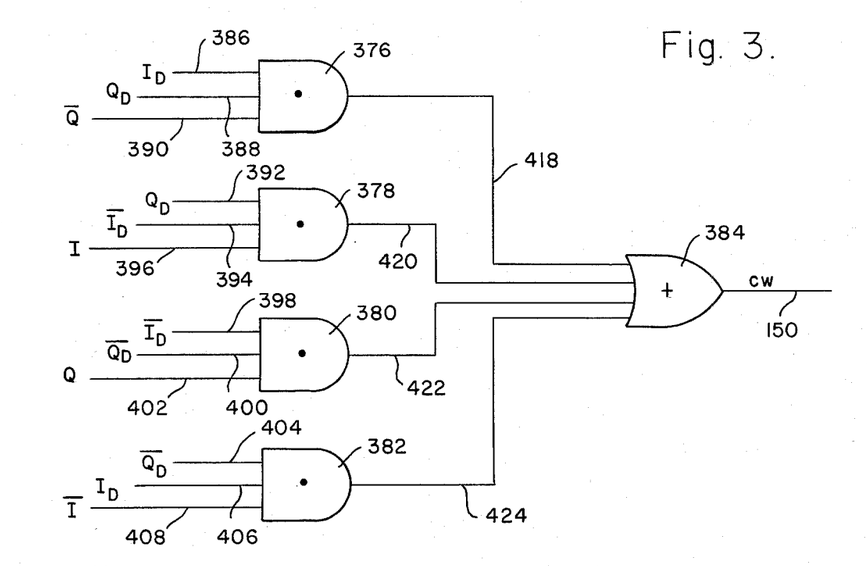
FIG. 3 is a logic diagram for forming the output of a crossing detector for clockwise rotation of the clutter signal phase angle.

Reference now to FIGS. 2 and 3 will illustrate the logical mechanization of quadrant crossing detector 34 in our exemplary system. Logical AND circuit 342 receives in-phase delayed signal $I_D$ by means of a lead 352, quadrature delayed signal $Q_D$ by means of lead 354, and in-phase inverted signal $\bar{I}$ on a lead 356. Logical AND circuit 344 receives quadrature delayed signal $Q_D$ on a lead 358, in-phase delayed inverted signal $\bar{I}_D$ on a lead 360, and quadrature inverted signal $\bar{Q}$ on a lead 362. Logical AND circuit 346 receives inverted in-phase delayed signal $\bar{I}_D$ on a lead 364, inverted quadrature delayed signal $\bar{Q}_D$ on a lead 366, and in-phase signal I on lead 368. Logical AND circuit 348 receives inverted quadrature delayed signal $\bar{Q}_D$ on lead 370, in-phase delayed signal $I_D$ on lead 372, and quadrature signal Q on lead 374. The outputs from logical AND circuits 342, 344, 346 and 348 individually go to logical OR circuit 350 by means of leads 410, 412, 414 and 416 respectively. True output from logical OR circuit 350 on lead 152 denotes a counter-clockwise crossing. The defining equation for the logic circuit of FIG. 2 is:

$$CCW = I_D Q_D \bar{I} + Q_D \bar{I}_D \bar{Q} + \bar{I}_D \bar{Q}_D I + \bar{Q}_D I_D Q.$$

In FIG. 3 logical AND circuit 376 receives in-phase delayed signal $I_D$ on a lead 386, quadrature delayed signal $Q_D$ on a lead 388, and inverted quadrature signal $\bar{Q}$ on a lead 390. Logical AND circuit 378 receives quadrature delayed signal $Q_D$ on a lead 392, inverted in-phase delayed signal $\bar{I}_D$ on a lead 394, and in-phase signal I on a lead 396. Logical AND circuit 380 receives inverted in-phase delayed signal $\bar{I}_D$ on a lead 398, inverted quadrature delayed signal $\bar{Q}_D$ on lead 400, and quadrature signal Q on lead 402. Logical AND circuit 382 receives inverted quadrature delayed signal $\bar{Q}_D$ on a lead 404, in-phase delayed signal $I_D$ on a lead 406, and inverted in-phase signal $\bar{I}$ on a lead 408. The outputs of logical AND circuits 376, 378, 380 and 382 are furnished to logical OR circuit 384 by means of leads 418, 420, 422 and 424 respectively. A true output from logical OR circuit 384 on lead 150 denotes a clockwise crossing.

The defining equation for the logic circuit of FIG. 3 is: $CW = I_D Q_D \bar{Q} + Q_D \bar{I}_D I + \bar{I}_D \bar{Q}_D Q + Q_D I_D \bar{I}.$ Crossings of 45° can be counted through the mechanization of an octant system. Any changes of more than 45° can be excluded as representing targets rather than clutter by utilizing a code system relating I, $\bar{I}$, Q and $\bar{Q}$, for example:

TABLE 1

| Signals | Relative Magnitude | Code |
|---|---|---|
| IQ | I>Q | 1 |
| IQ | I<Q | 2 |
| $\bar{I}$Q | I>Q | 3 |
| $\bar{I}$Q | I>Q | 4 |
| $\bar{I}\bar{Q}$ | I>Q | 5 |
| $\bar{I}\bar{Q}$ | I<Q | 6 |
| I$\bar{Q}$ | I<Q | 7 |
| I$\bar{Q}$ | I>Q | 8 |

Since a 45° phase shift per pulse repetition frequency (PRF) interval corresponds to about 125 knots, any changes of more than 45° can be excluded because they represent targets rather than clutter. Consequently we code both the delayed and undelayed signals above and then $$CCW = 1_D 2 + 2_D 3 + 3_D 4 + 4_D 5 + 5_D 6 + 6_D 7 + 7_D 8 + 8_D 1$$

and $$CW = 1 2_D + 2 3_D + 3 4_D + 4 5_D + 5 6_{D} + 6 7_D + 7 8_D + 8 1_D$$

where $1_D$ means Code 1 delayed and so on.

The only terms included here are the ones causing a crossing from one adjacent segment to another. Omitting larger changes such as, for example, crossing more than one segment, provides an automatic filtering for large targets moving at high velocities.

Figure 5:
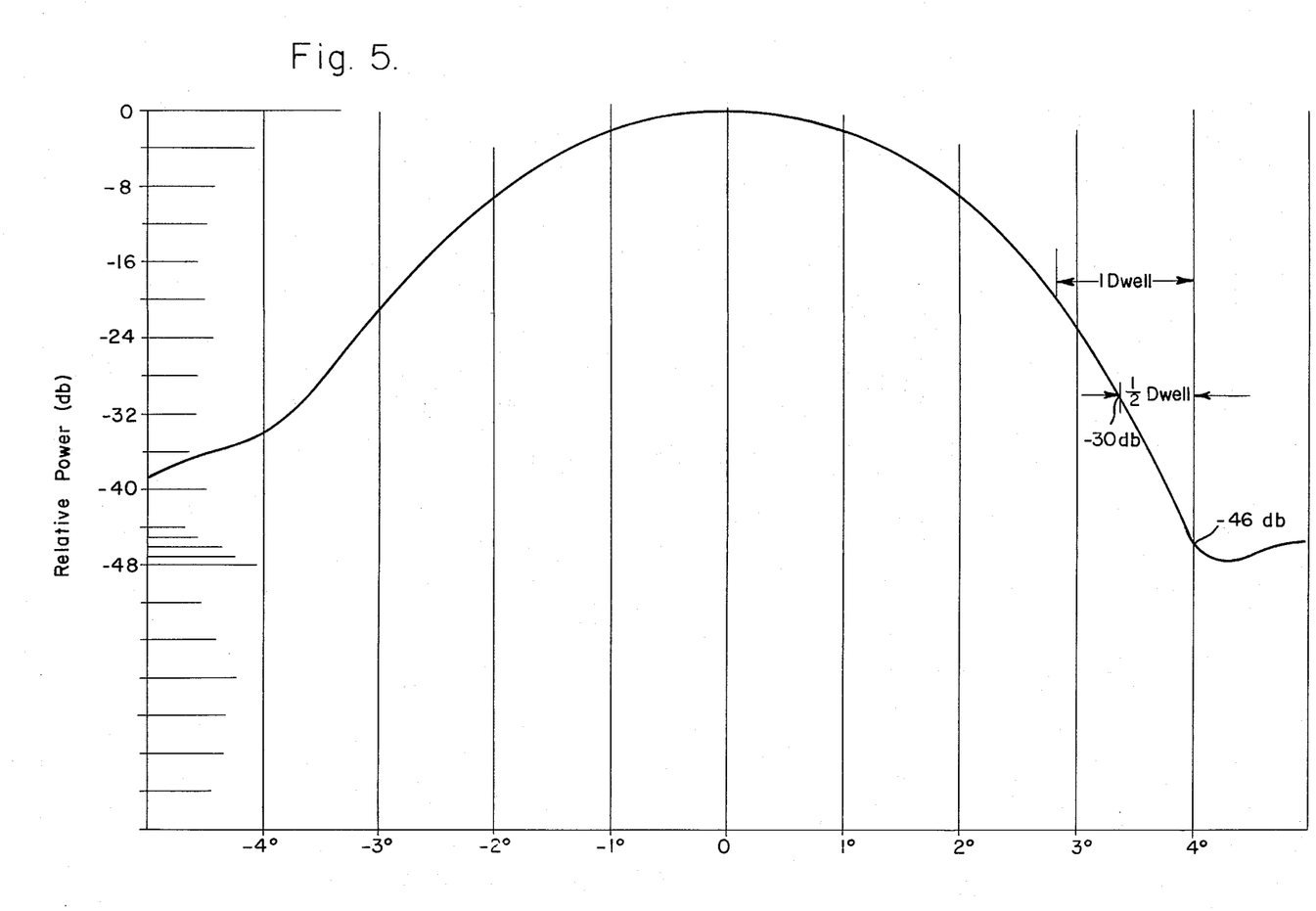
FIG. 5 is a conventional antenna pattern of relative power as a function of azimuth useful in an exemplary explanation of the invention.
Figure 6:
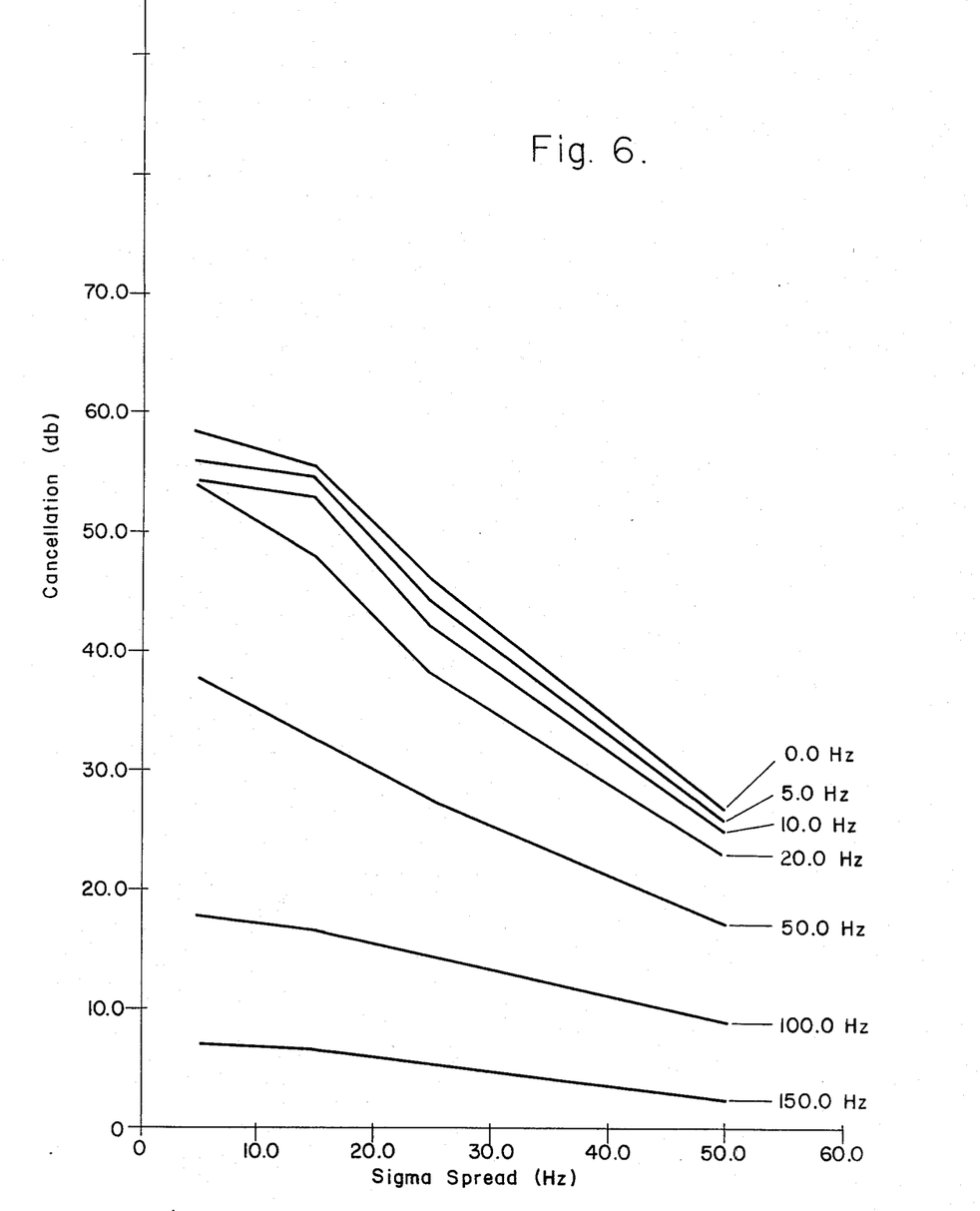
FIG. 6 is a graph of clutter cancellation useful in an exemplary explanation of the invention.

Referring to FIGS. 5 and 6, a method for deriving the transient response may be derived. FIG. 5 shows a typical azimuth antenna pattern and FIG. 6 shows clutter cancellation achievable in a first filter. At an antenna scan rate of 30 rpm, the 1σ spread of land clutter will be 15 Hz. An antenna rotation rate of 30 rpm provides a transmitted pulse every 0.05° for a pulse repetition frequency (PRF) of 3600. A half dwell requires about 13 transmissions which, from FIG. 5, will cause an increase in the clutter level of about 16 db on the edge of the beam; that is, moving toward the right, 46 db − 30 db = 16 db. Assume that we scan by a very large clutter source that just crosses the clutter tracker threshold at 4° off beam center, as indicated in FIG. 5. Referring to FIG. 6, we note that clutter with a doppler of 100 Hz can be cancelled 17 db with respect to the output noise level. By the end of the half dwell the clutter will be 16 db larger; therefore interpolating FIG. 6 indicates that the tracker must pull to within about 50 Hz of the desired value during the dwell. However, our 1σ measurement error is less than 10 Hz, so cancellation will occur.

Figure 7A:
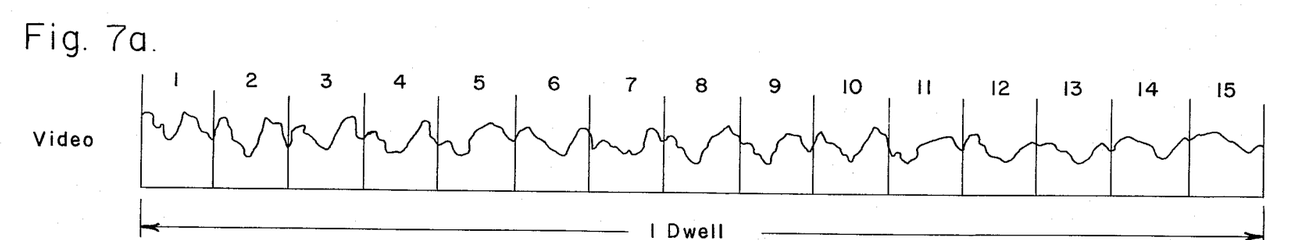
FIG. 7a is a conceptual curve of a video signal obtained during the PRI intervals constituting one dwell period.
Figures 7B, 7C:
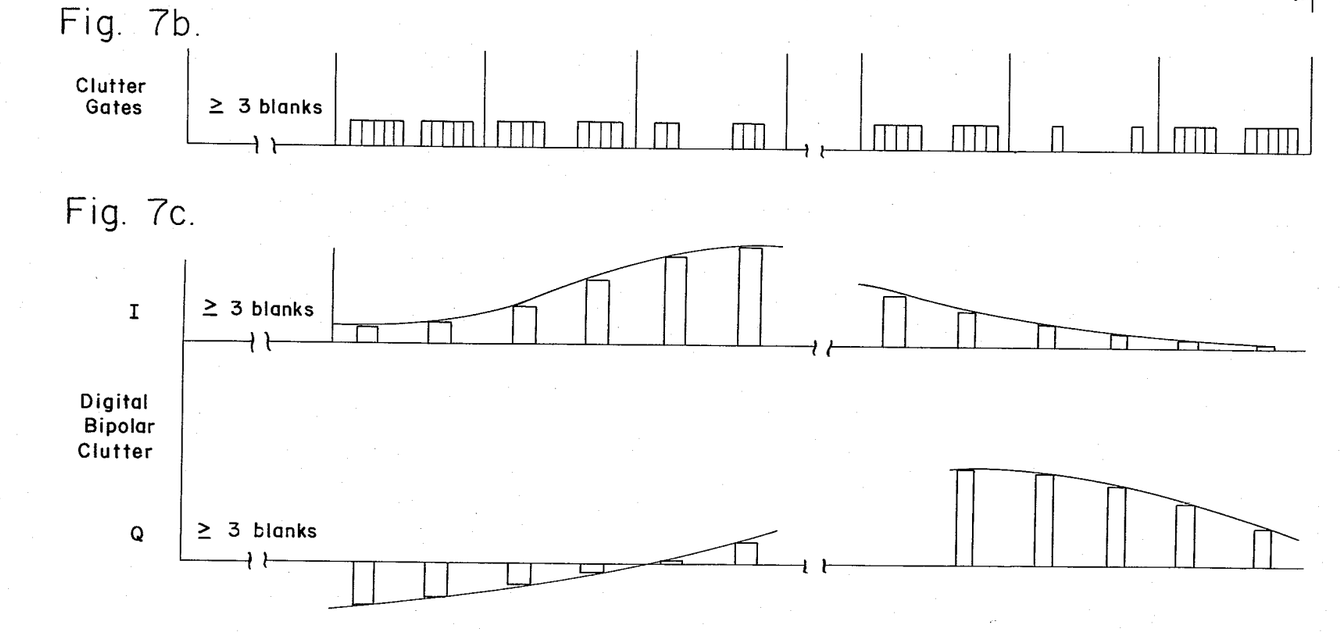
FIG. 7b is a conceptual diagram showing an exemplary output of the logic elements 50 of FIG. 1.
FIG. 7c is a conceptual diagram showing the digital bipolar output signal from scaling circuit 58.
Figure 8A:
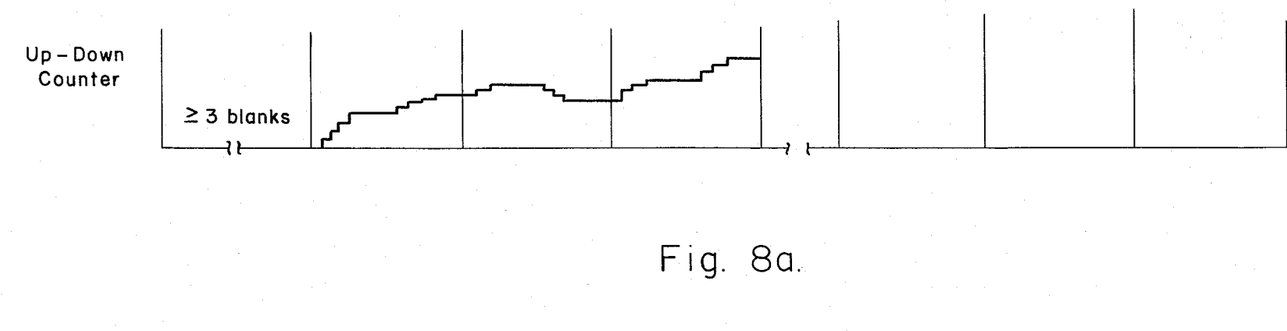
FIG. 8a is a conceptual diagram showing an exemplary signal output at up-down counter 54 of FIG. 1.
Figure 8B:
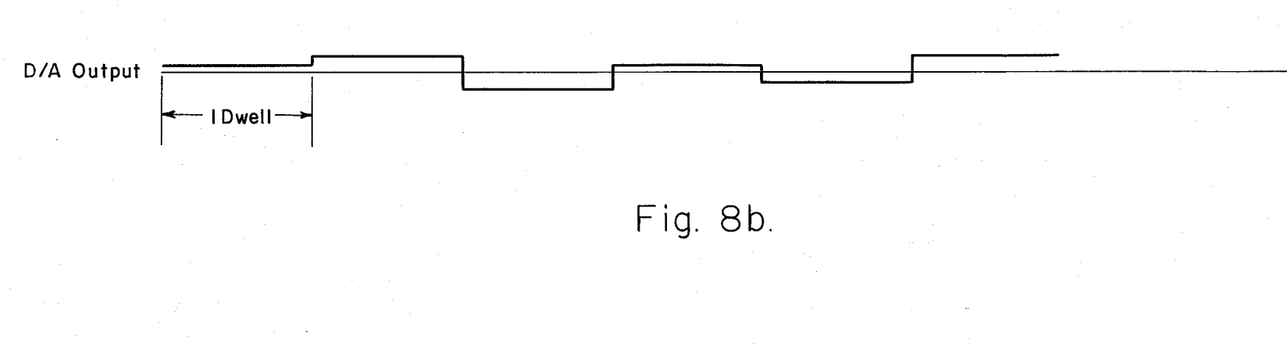
FIG. 8b is a conceptual diagram showing an exemplary signal output of digital to analog converter 86 of FIG. 1.

Referring now to FIG. 7a, there is illustrated a video signal occurring over a period of one dwell, which comprises between 10 and 15 pulse repetition intervals. FIG. 7b illustrates an expanded pulse repetition interval scale showing the range bins. In most systems the first three pulse repetition intervals, at least, are not usable for measurement purposes. This has been illustrated by three blanks in FIG. 7b. The remaining pulse repetition intervals show a clutter gate with varying numbers of range bins existing during the existence of the clutter gate. FIG. 7c is illustrative of a digital bipolar clutter signal with the in-phase and quadrature components shown as out of phase with each other. The sine wave envelope represents the frequency error. Usually the frequency error over one dwell only generates a small change in phase. In FIG. 8a there is shown the output of up-down counter 54 responsive to counter 56 which counts the number of range bins during the existence of the clutter gate, and the output of logic AND circuits 50 denoting a clockwise count, and 52 denoting a counter-clockwise count. Application of up-down counter output signal to scaling circuit 58 and thence through smoothing and predicting αβ tracker 66, and further processing through digital-to-analog converter 86, results in a voltage level as illustrated at FIG. 8b being applied to voltage-controlled crystal oscillator 88. It is important to note that the voltage level supplied to voltage-controlled crystal oscillator 88 by means of digital-to-analog converter 86 remains constant over the period of one dwell.

There has thus been described a clutter tracking system in which a received clutter velocity signal has been shifted to zero doppler in order to achieve optimum MTI cancellation. Measured and delayed doppler velocities are used to offset the voltage-controlled crystal oscillator and facilitate optimum clutter cancellation.

What is claimed is:

1. A radar clutter tracker system responsive to clutter frequencies, said system having a dual channel delay subsystem, comprising the combination:
    a dual channel analog-to-digital converter fed by a pair of quadrature signals;
    a first digital circuit electrically connected to the converter;
    a second digital circuit electrically connected to the converter; and
    a crossing detector the input of which is electrically connected to the converter and the first and second digital circuits.

2. The system of claim 1 including a pair of binary logic AND gates electrically connected to the crossing detector.

3. The system of claim 2, including an up-down counter electrically connected to the outputs of the AND gates.

4. The system of claim 3, including:
    a clutter detector circuit; and
    a dividing circuit electrically connected to the up-down counter and the clutter detector circuit.

5. The system of claim 4 including a digital filter circuit electrically connected to the output of the dividing circuit.

6. The system of claim 1, including a clutter detector circuit electrically connected to the converter.

7. The system of claim 6, wherein the clutter detector circuit includes a pair of comparators electrically connected to the output of the converter.

8. A radar clutter tracker system responsive to radar signals for controlling the clutter frequency comprising:
    phase angle measurement means responsive to said radar signals, said phase angle measurement means having a resolution of 90° and submultiples thereof;
    scaling means for developing a digital error signal from the resultant of said phase angle measurement means;
    digital-to-analog converter means for accepting converted error signals;
    voltage controlled oscillator means accepting said converted error signal for controlling the frequency thereof;
    coding means wherein a phase angle excursion greater than one resolution unit is ignored;
    delay means responsive to signals from a radar system;
    threshold means for eliminating radar signals below a predetermined signal level;
    first logic means determining a clutter gate, said phase angle measurement means also being responsive to signal output from said delay means and signals from said radar system;
    second logic means responsive to signal output from said phase angle measurement means and said clutter gate;
    first counter means for counting the number of clutter gates existing during a given sample interval;
    second counter means for counting phase angle units occurring during a given sample interval, said scaling means also being responsive to both first and second counter means and developing therefrom a numerical frequency error signal; and
    αβ tracking and predicting means for deriving a linear error prediction to said digital-to-analog converter means.

9. The system of claim 8 wherein said first logic means comprises a logic OR circuit responsive to output signal from said threshhold means;
    shift register means responsive to signal output from said OR circuit;
    logic AND means responsive to signal output from said OR circuit and said shift register means; and
    bistable circuit means responsive to signal output from said logic AND circuit and said shift register means.

10. A radar clutter tracker system using a smoothed doppler frequency measurement comprising in combination:

delay means responsive to in-phase and quadrature signals from a radar system;

comparison level means responsive to in-phase and quadrature signals from the radar system;

phase angle measurement means responsive to both instant and delayed in-phase and quadrature signals from a radar system;

first logic means responsive to both in-phase and quadrature signal levels supplied from the comparison level means;

shift register means responsive to output signal from said first logic means;

second logic means responsive to output signal from said first logic means and said shift register means and forming therefrom a clutter gate;

third logic means responsive to output signals from said phase angle measurement means and said clutter gate;

scaling means for developing a digital error signal from the resultant of said phase angle measurement means and said clutter gate;

signal smoothing means for reducing second order error signal effects;

digital-to-analog converter means for converting said digital error signal; and voltage controlled oscillator means accepting said converted error signal for controlling the frequency thereof.

11. The system of claim 10 wherein said phase angle measurement means has a resolution of 90° and submultiples thereof.

12. The system of claim 11 including coding means wherein a phase angle excursion greater than one resolution unit is ignored.

13. The system of claim 12 wherein said signal smoothing means comprises $\alpha\beta$ frequency tracking and prediction means.

* * * * *